June 27, 1967  A. M. ALEXANDRESCU  3,327,478
HYDRAULIC COUPLING

Filed Oct. 21, 1965  4 Sheets-Sheet 1

INVENTOR.
ALEXANDER M. ALEXANDRESCU
BY
a. m. Alexandrescu

June 27, 1967  A. M. ALEXANDRESCU  3,327,478
HYDRAULIC COUPLING
Filed Oct. 2J, 1965  4 Sheets-Sheet 2
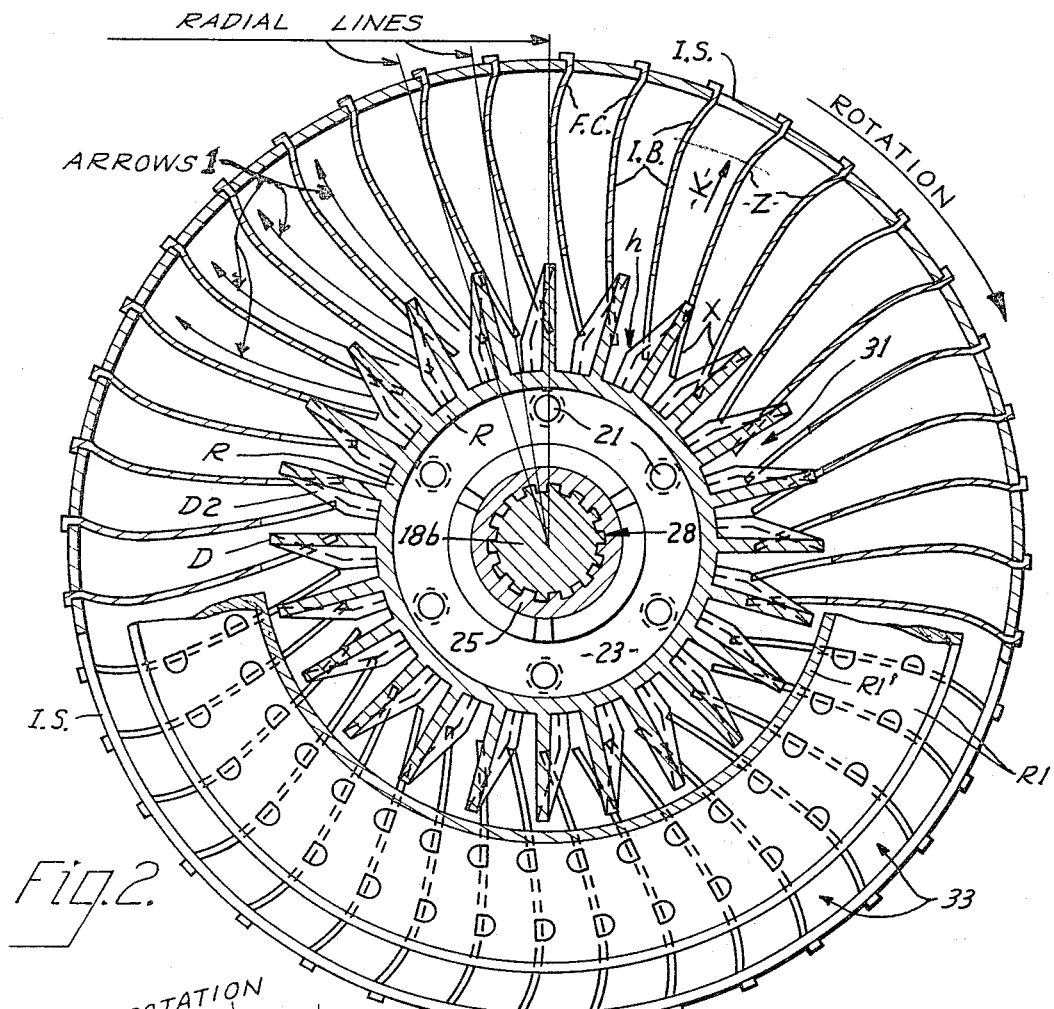
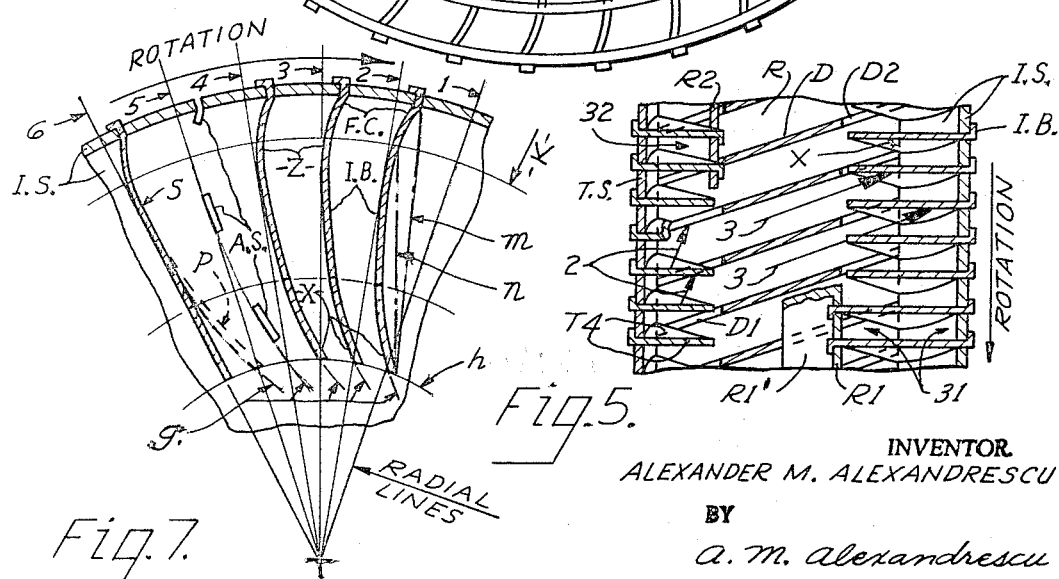
INVENTOR.
ALEXANDER M. ALEXANDRESCU
BY
a. m. alexandrescu INVENTOR.
ALEXANDER M. ALEXANDRESCU
BY
a. m. alexandrescu

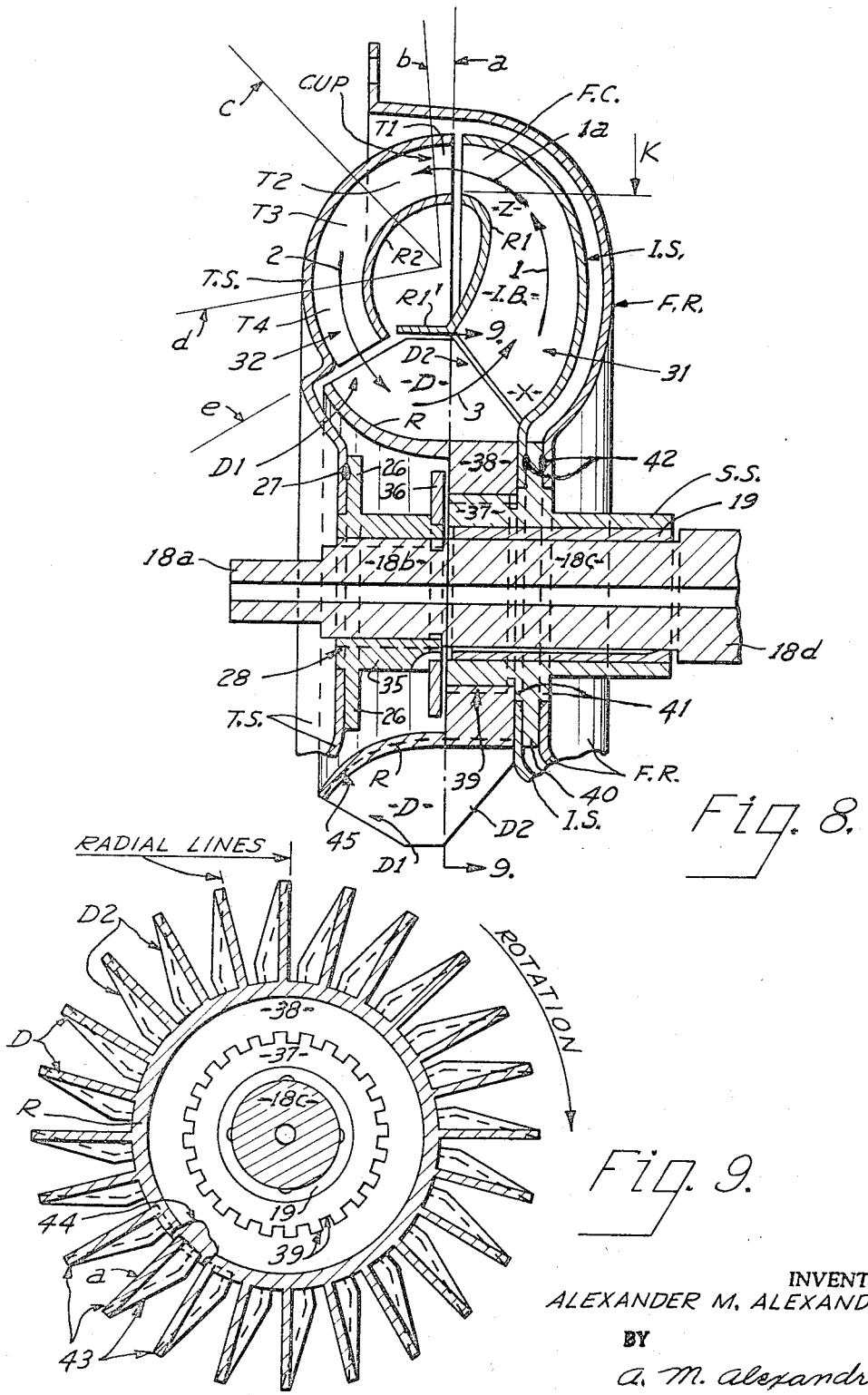

United States Patent Office 3,327,478
Patented June 27, 1967

3,327,478
HYDRAULIC COUPLING
Alexander M. Alexandrescu, 549 E. 114th St.,
Cleveland, Ohio 44108
Filed Oct. 21, 1965, Ser. No. 499,757
10 Claims. (Cl. 60—54)

ABSTRACT OF THE DISCLOSURE

This invention comprises an hydraulic coupling in which a turbine is driven by means of double fluid driving action in series, whereby fluid driving power is increased, excessive slippage in the transmission of power is prevented, and economies in the use of fuel are effected.

---

This invention relates generally to hydraulic couplings, but has reference more particularly to improvements in fluid couplings of the type disclosed in my Reissue Patent No. 24,991, and in my Patents Nos. 2,952,976, 3,167,917 and 3,167,918.

A primary object of the invention is to provide an hydraulic coupling of the character described embodying substantial improvements in design and function over previous types of fluid couplings.

Another object of the invention is to provide an hydraulic coupling of the character described in which a turbine is driven by means of double fluid driving action in series, whereby to increase the fluid driving power in coupling, to prevent excessive slippage in the transmission of power, and to effect economies in the use of fuel.

A further object of the invention is to provide an improved hydraulic coupling device which produces a substantial torque multiplication, and which, in effect, is a transmission in itself.

A further object of the invention is to provide an improved hydraulic coupling device which is adaptable to all makes and types of automatic transmissions, without necessitating major changes in the rear of the vehicle engine, transmission case, or the internal parts of the mechanical automatic transmission.

A further object of the invention is to provide an improved hydraulic coupling device which is designed for economical production on high speed machinery.

Other objects and advantages of my invention will be apparent during the course of the following description.

In the accompanying drawings forming a part of this specification, and in which like numerals are employed to designate like parts throughout the same, FIG. 1 is a vertical cross-sectional view of an hydraulic coupling embodying the invention, as viewed from the left side;

FIG. 2 is a vertical cross-sectional view of the hydraulic coupling, taken on the line 2—2 of FIG. 1, and illustrating the impeller and rotary reactor;

FIG. 5 is a fragmentary cross-sectional view, taken on the line 5—5 of FIG. 1;

FIG. 7 is a view showing a fragmentary portion of the impeller, at the upper part of FIG. 2, and illustrating the shape and position of the impeller blades, which produces the high velocity of fluid circulation in the coupling;

FIG. 8 is a view similar to FIG. 1, but showing a modification of the invention, and FIG. 9 is a fragmentary cross-sectional view, taken on the line 9—9 of FIG. 8.

Figure 1:
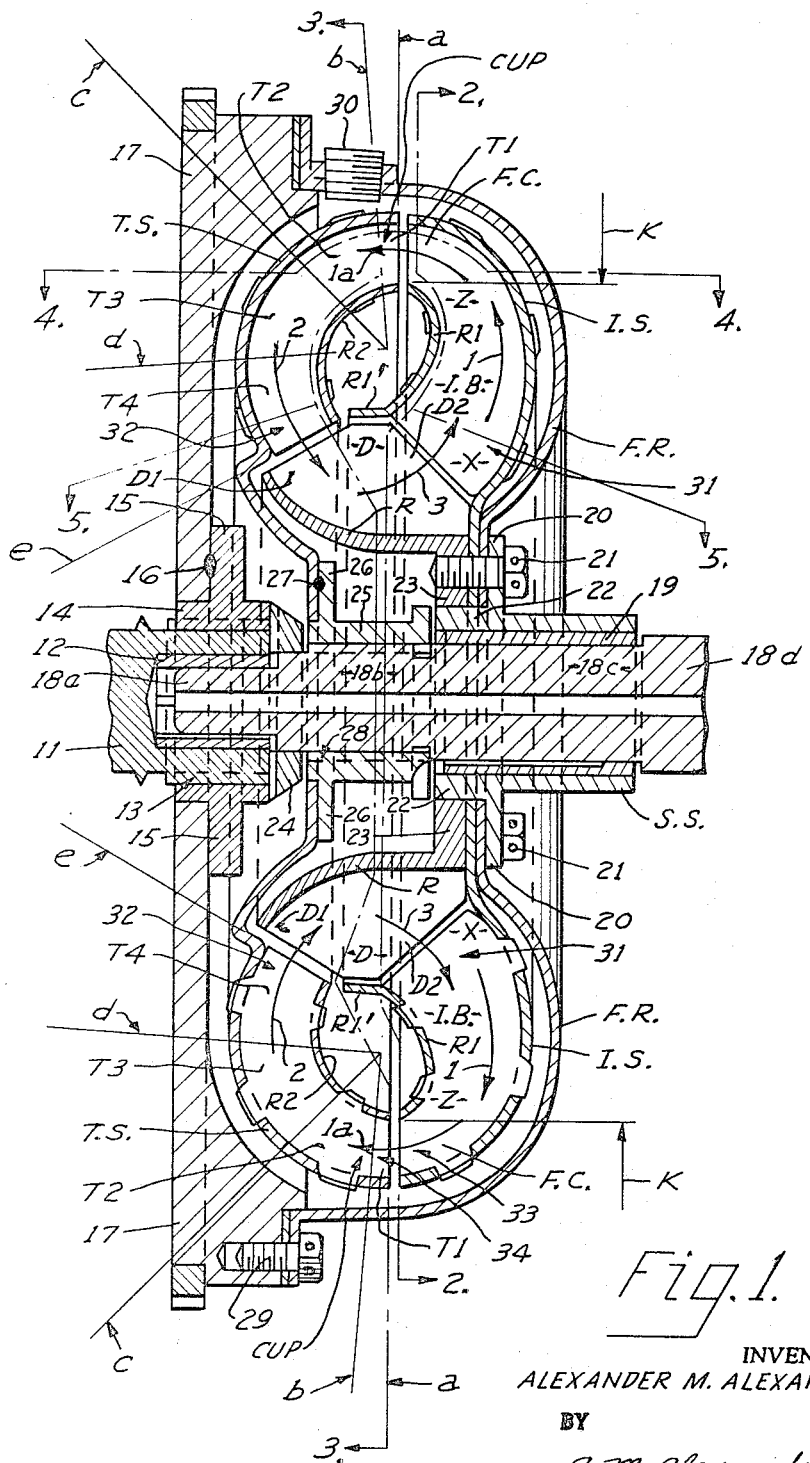

Referring now to the drawings, and in particular to FIG. 1, it is noted that in this view, certain parts have been omitted, including the engine block, the transmission housing with its bottom pan, and the parts which are adapted to be driven by the turbine shaft. These are omitted for the reason that these parts are of a more or less conventional nature, can be seen in my U.S. Patent 3,167,917, and are unnecessary to show, since the device of the present invention is designed to fit and to replace all makes of present fluid couplings, including the present torque converters.

In FIG. 1, reference numeral 11 designates the rear end of an engine crankshaft or driving shaft, and 12, a sleeve bearing which is set in the end of the crankshaft 11.

The crankshaft 11 is splined, as at 13, to receive a cooperatively splined collar 14 provided with an annular flange 15.

A flywheel 17 is mounted on the collar 14 and is electrically spot welded, as at 16, to the flange 15 of the collar.

A turbine or drive shaft 18 is provided, having its front end 18a mounted for rotation in bearing 12, and its rear end 18d adapted for attachment to the mechanical shifting transmission to which reference has been made above.

A sleeve shaft S.S., and its sleeve bearing 19 is mounted for rotation on the portion 18c of the turbine shaft 18, and is provided with an annular flange 20. The front end of this sleeve shaft has a relatively thick wall, as indicated at 22, and over this end of the sleeve shaft are fitted a fluid retainer shell F.R., an impeller outer shell I.S., and flange 23 of a rotary reactor R. The flange 23 is a relatively thick flange having threaded openings. As shown in FIGS. 1 and 2, cap screw bolts 21 serve to clamp together the sleeve shaft flange 20, the fluid retainer shell F.R., the impeller outer shell I.S., and the rotary reactor flange 23, so that all these parts become, in effect, a solid unit. The outer portion of the fluid retainer shell F.R. is clamped to the flywheel 17 by means of cap screw bolts 29, as shown at the bottom of FIG. 1. Thus, as described above, and as shown in FIG. 1, the sleeve S.S. not only supports but connects together the rotary reactor, the impeller shell and the fluid retainer shell.

It may be noted, at this point, that all of the parts to which reference has been made, including the engine crankshaft, flywheel, fluid retainer, impeller, rotary reactor, and sleeve shaft, are rotated and are controlled directly by the speed of the engine, and that the so-combined mechanism produces a fluid driving power of very high velocity.

The turbine shaft 18 has a portion 18b which is splined, as at 28 (see FIGS. 1, 2 and 3), to receive a cooperatively-splined hub 25. The hub 25 is provided with an annular flange 26 to which is electrically spot-welded, as at 27, the turbine outer shell T.S., as best seen in FIG. 1. On the turbine shaft 18, between the hub 25 and the rear end of the engine crankshaft 11, a thrust washer bearing 24 is interposed.

The rotary reactor R, is of a construction which is a modification over the fluid shifter C and blades E of the fluid coupling in my Patent No. 3,167,918.

The reactor R, with its blades D, performs two actions or functions. It drives the turbine with second fluid action, redirects the fluid from the turbine into the impeller vanes, and helps the impeller to produce a very great centrifugal fluid driving pressure.

The rotary reactor consists of a shell R, the flange 23, and a multiplicity of driving blades D, as best shown in FIGS. 1, 2, 3 and 5.

The impeller consists of an outer shell I.S., an inner shell R1, and a multiplicity of two-way curved impeller blades I.B. The impeller inner shell R1 is of a new design, being provided with a circumferential flange or ring R1', which surrounds the rotary reacting driving blades D. This ring helps the blades D to redirect the fluid from turbine to impeller, and is the ring of fluid entrance to the impeller. This construction is best seen in FIGS. 1, 2 and 5.

As best seen in FIGS. 2 and 7, the impeller blades I.B. have curved tip or end portions F.C. disposed outwardly beyond the line K, which are similar in curvature to the corresponding portions of the impeller blades in my Patents 3,167,917 and 3,167,918. Inwardly of the line K, however, the impeller blades are of a new design, as best seen in FIGS. 2 and 7. Referring to FIG. 7, the portions Z of the blades I.B. below the line K are curved continuously in the direction of rotation of the impeller to a point indicated by the line $h$, with the inner end portions X of the blades curved more sharply than the portions Z of the blades. It may be further noted that the location of the blades in FIG. 7 is indicated with reference to the lines marked "Radial Lines." The upper ends of the portions Z of the blades are set adjacent these radial lines, and the inner ends of the portions X of the blades terminate substantially at the radial lines adjacent those at which the upper ends of the portions Z of the blades are set.

With further reference to FIG. 7, it will be seen that the impeller blade at the extreme right is set with the inner terminal end of the portion X along the radial line 1, and with the upper end of the portion Z set against the radial line 2. Forwardly of this blade, lines $m$ and $n$ are indicated, the line $m$ indicating the extent of the curvature of the blade from one end to the other, and the line $n$ indicating the extent of the curvature of the blade from the line K to the line $h$ at the inner periphery of the coupling.

Also, in FIG. 7, the blade along the radial line 5 has been omitted for the purpose of showing assembly slots A.S. which are cut in the impeller outer shell I.S., it being understood that the blades are provided with ears or tongues adapted to enter these slots and to be bent to assemble the blades with the impeller shell. These tabs can be seen in FIG. 1.

FIG. 7 also shows, for purposes of comparison, an impeller blade S at the extreme left, along the radial line 6, which blade is similar to that shown in my Patent 3,167,917. The difference in curvature between the blade S and the blades I.B. is indicated by the dotted line P, which extends along the curved lines $g$.

The turbine consists of the turbine outer shell T.S., turbine inner shell R2, and a multiplicity of turbine blades, interposed between and connected to these shells.

The turbine blades are of a construction which is modified from that shown in my previous Patents 2,952,976; 3,167,917 and 3,167,918. Each blade consists of four sections or areas, which are identified by reference characters T1, T2, T3 and T4.

Figure 6:
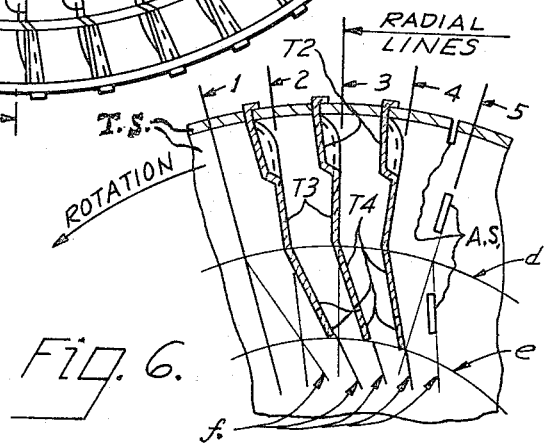
FIG. 6 is a view showing a fragmentary portion of the turbine, at the upper part of FIG. 3, and illustrating the shape and position of the turbine blades to produce the second fluid driving action.

As illustrated in FIGS. 1, 3, 4, 5 and 6, the turbine blades, at their outer periphery, have a first section T1, which extends between the lines $a$ and $b$, a second section T2, which extends between the lines $b$ and $c$, a third section T3, which extends between the lines $c$ and $d$, and a fourth section T4, which extends between the lines $d$ and $e$. The blades are set with their sections T3 on or along the radial lines seen in FIG. 3. As shown in FIGS. 1, 3, 4 and 6, the turbine blades, on their outer periphery, are cup-shaped, the cups being set in the direction of rotation. Section T4 of each blade is, as best seen in FIG. 6, inclined from one radial line to the next adjacent radial line. These inclined portions or sections T4 of the blade extend from the circumferential line $d$ to the circumferential line $e$, and are set on the inclined lines $f$, with their inner ends set in a direction opposite to the direction of rotation. This setting of the turbine blades redirects the fluid from the turbine into the rotary reactor blades D, producing the second fluid driving action (see FIGS. 1, 3 and 5).

The operation of the device may now be described as follows.

The hydraulic coupling is operated by means of a fluid. This fluid can be supplied in the coupling automatically in the manner illustrated and described in my Patent 3,167,918, or it may be supplied by removing the plug 30 (FIG. 1) and filling the coupling through the opening in which this plug is mounted.

The driving power in the device is produced by two important factors (1) by the construction and the combined actions of the rotary reactor screw-like blades D and (2) by the two-way forwardly curved or arcuated ends of the impeller blades shown in the direction of rotation.

The combined action of rotary reactor and impeller produces a very high velocity of fluid circulating driving power in the coupling.

The fluid driving power is indicated by the large arrows 3–1–1$a$–2, and by the small branch arrows 2$a$, as shown in FIGS. 1, 2, 3, 4 and 5.

It will be noted from FIG. 1 that the area enclosed within the reactor shell R, and shells I.S. and T.S. are oval shaped, rather than circular or round. This oval shape produces a greater centrifugal fluid driving power than is produced with a circular or round area. The impeller inlet 31 is much larger than the turbine outlet 32. The impeller outlet 33 is smaller than the turbine inlet 34. This constructional arrangement is for the purpose of projecting a very great fluid driving power at the outer periphery, and at the inner periphery of the turbine, and is best shown in FIGS. 1, 2, 3 and 5.

The rotary reactor blades D serve or produce double service, which may be explained as follows:

The turbine is driven at D1, and at D2, the fluid is shifted from the turbine to the impeller. This is shown in FIG. 1, and is very clear in FIG. 5. In FIGS. 1 and 5, rotor R, with its blades D, at D1, rotates inside the turbine blades at T4. The position of the blades in these two units are not parallel, the blades of the two units being made, in two different positions, to drive the turbine, and to shift (or redirect) the fluid from turbine to impeller. The fluid projected by the turbine blades into the rotor blades D, at D1, drives the turbine at its inner periphery, as indicated by the arrows 2. Momentarily, the fluid is redirected to the impeller curved blades, as indicated by the arrows 3.

The curved or arcuated blades of the impeller, as shown in FIGS. 2 and 7, centrifugally redirect the fluid in the direction of rotation as indicated by the arcuated arrows 1 in FIG. 2.

In this device, the turbine is driven by the double fluid driving actions, operating in series.

In connection with the first of these actions, it has been described above that the sleeve shaft S.S., the rotary reactor R, and the impeller I.S. are rotated directly by the engine, and that the fluid driving power in the device is regulated and controlled by the acceleration, the speed, and the power of the engine.

Figure 4:
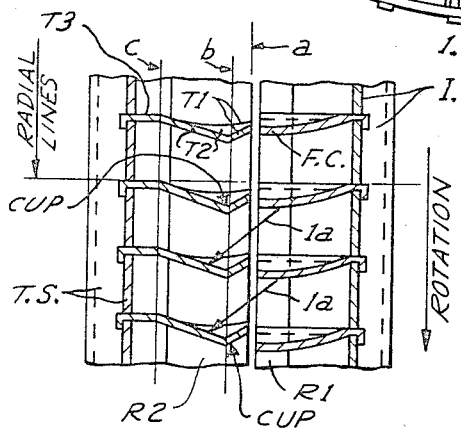
FIG. 4 is a fragmentary cross-sectional view, taken on the line 4—4 of FIG. 1.

When operating or driving a vehicle, the fluid from rotary reacting blades D, at the edge D2, is shifted or redirected into the impeller vanes as indicated by the arrows 3 in FIGS. 1 and 5. The fluid in the impeller vanes is centrifugally redirected by the impeller two-way arcuated blades I.B., as is indicated by the arcuated arrows 1 in FIGS 1 and 2. The fluid from the impeller is projected by the outer periphery tips F.C. (forward curved) impeller blades into the turbine cups. This first fluid action is shown in FIGS. 1 and 4.

The second action of the hydraulic coupling consists in driving the turbine at the inner periphery of the coupling. In this action, the fluid projected by the impeller outlet 33 through the turbine inlet 34 in the turbine cups is discharged from the turbine cups in the path of the torus, creating a great pressure in between the turbine blade sections T3. This fluid, under the great pressure produced by the impeller, passes through the relatively narrow passage of turbine outlet 32, formed between the turbine outer shell T.S. and the turbine inner shell R2, also, in between the inclined sections T4 of the turbine blades. The fluid pressure from the turbine is projected by the turbine outlet 32 into the rotary reactor blades D at D1.

Figure 3:
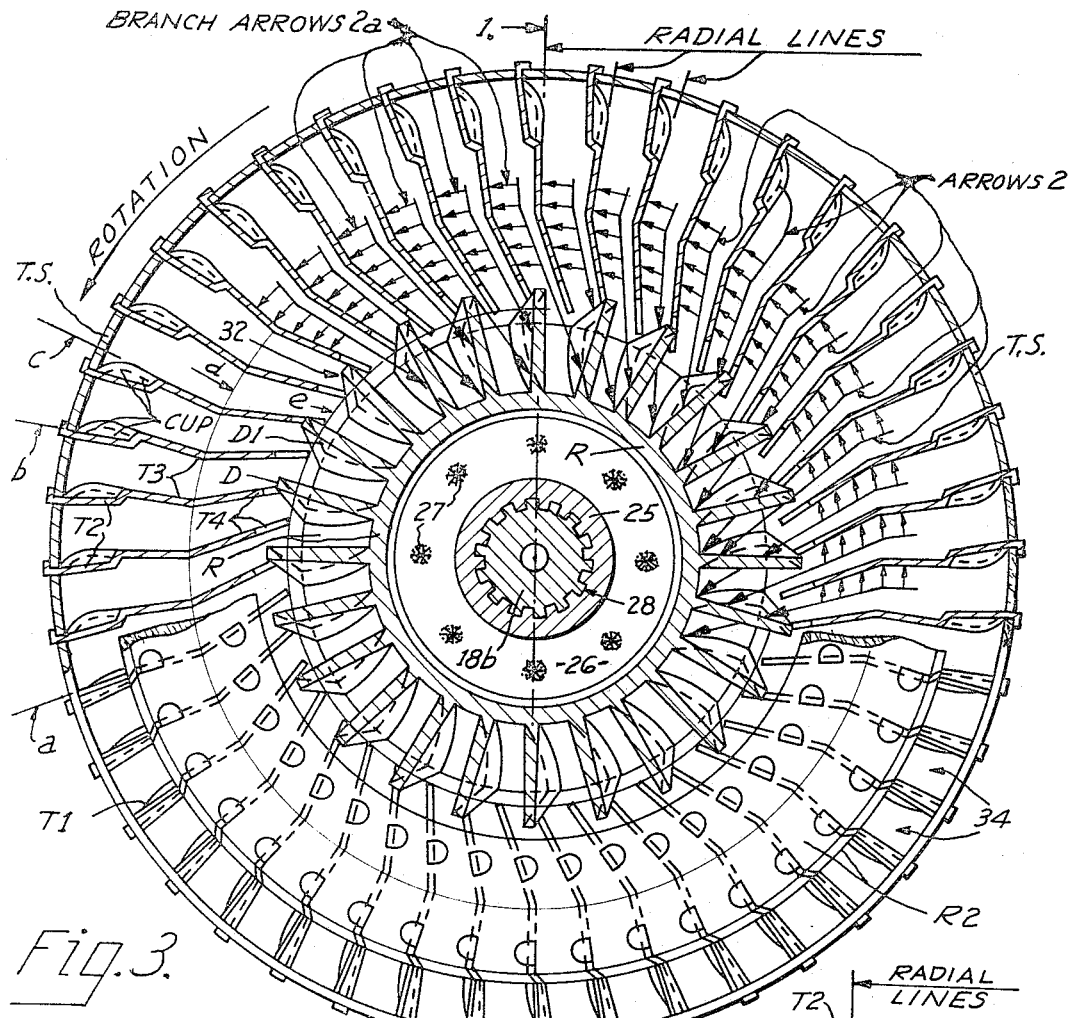
FIG. 3 is a vertical cross-sectional view of the hydraulic coupling, taken on the line 3—3 of FIG. 1, and illustrating the turbine and rotary reactor.

When the vehicle initially accelerates, the fluid projected from the turbine outlet 32 is redirected by the tilted sections T4 of the turbine blades into the reactor blades at D1, as indicated by arrows 2 in FIGS. 1, 3 and 5. The fluid pressure is then pushed (or compressed) by the deflecting blades D at D1 of the rotary reactor R in the direction of rotation. In this way, the fluid between the turbine blades reacts to cause rotation of the turbine in the direction of rotation, as indicated by the branch arrows 2a in FIG. 3. As previously described, the fluid projected from the turbine into the rotary reactor blades performs the second action in hydraulic coupling.

As shown in FIGS. 1, 3 and 5, the fluid indicated by arrows 2 is projected through the turbine outlet 32 into the reactor blades D, strikes these blades at D1, and the fluid is immediately redirected by the reacting blades D at D2 into the impeller inlet 31 to be again re-projected. The fluid shifted from the turbine to the impeller is clearly indicated by the arrows 3 in FIGS. 1 and 5.

In FIGS. 8 and 9, the construction of the impeller, turbine and turbine output shaft are identical with that shown in FIGS. 1 to 7 inclusive. However, the construction of the sleeve shaft S.S. is modified as follows:

The sleeve shaft S.S. has an annular flange 40 which has a widened base portion forming axially spaced shoulders 41. The impeller outer shell I.S. is mounted on the front one of these shoulders, and the fluid retainer or torus cover F.R. is mounted on the other shoulder. The outer shell and fluid retainer are spot welded to the flange 40, as at 42.

The wall of the sleeve shaft S.S. is thickened, as at 37, and is splined, as at 39, to receive cooperating splines on a thickened flange 38 of the rotary reactor R.

As shown in FIG. 9, the fluid driving plates D are made of steel plates, produced by stamping devices, and are set in molding forms in the foundry, so that when the hot liquid metal is poured to produce the rotary shell R and its rear flange 38, the steel blades D are welded to the rotary shell R by the hot metal. The numeral 43 indicates three of the steel blades with their inner edges in the shell R, while numeral 44 indicates a portion of the casting broken off to expose the inner end of the steel blade.

In FIG. 8, numeral 45 indicates, in dotted lines, the inner edges of the blades D. The hub 35, which corresponds with the hub 25 in FIG. 1, is provided, in this case, with a stop washer 36 which retains the rotary reactor R in its position. The sleeve shaft S.S. is provided internally with a sleeve bearing 19.

The mechanism of FIGS. 8 and 9 does not require the use of rivets or bolts. The rotary reactor, impeller, and fluid retainer are supported by the sleeve shaft and rotate about the turbine output, shaft, thus being directly rotated by the engine.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. In a fluid coupling of the character described, an impeller having inner and outer shells and circumferentially-spaced impeller blades between said outer and inner shells, a turbine having inner and outer shells and circumferentially-spaced driven blades, a rotor having circumferentially-spaced rotor blades extending between said impeller and turbine, and means for redirecting fluid between said rotor blades to said impeller, said means comprising an annular member carried by said impeller inner shell and extending from the inner periphery of the impeller inner shell to a point closely adjacent the inner periphery of said turbine inner shell.

2. A fluid coupling, as defined in claim 1, wherein the blades of said impeller have opposite end portions, both of which are curved in the direction of rotation of the impeller.

3. A fluid coupling, as defined in claim 2, wherein the inner end portions of the impeller blades are curved sharply to provide restricted spaces between the inner ends of adjacent blades.

4. A fluid coupling, as set forth in claim 3, wherein said impeller outer shell, turbine outer shell and rotor form a torus of ovoidal cross-section.

5. In a fluid coupling of the character described, a driving shaft and a coaxial driven shaft, an impeller rotatable with said driving shaft and provided with circumferentially-spaced blades of generally arcuate cross-section and having end portions which are curved in the direction of rotation of the impeller, a turbine rotatable with said driven shaft and provided with driven blades having cup-shaped portions at their outer ends set in the direction of rotation of the turbine and having inclined portions at their inner ends which are inclined in a direction opposite to the direction of rotation of the turbine, a rotary reactor, a fluid circulating control means located at the inner periphery of said coupling having vanes extending across from said impeller to said turbine and shaped to forcefully drive the turbine, and said rotary reactor and impeller coacting to redirect the fluid from the turbine to the impeller to be again projected by the impeller.

6. In a fluid coupling of the character described, a sleeve shaft having axially-spaced shoulders, an impeller outer shell mounted on one of said shoulders, a fluid retainer cover mounted on the other of said shoulders, and a rotary reactor splined to said shaft adjacent said impeller outer shell.

7. A fluid coupling, as defined in claim 6, wherein said shell and cover are welded to said sleeve shaft.

8. A fluid coupling, as defined in claim 7, including a driven shaft, a hub splined to said driven shaft, said hub having a radial flange, and a turbine cover welded to said flange.

9. In a fluid coupling having a driving shaft and a coaxial driven shaft, an impeller rotatable with said driving shaft and provided with blades each of which has inner and outer peripheral end portions both of which are curved in the direction of rotation of the impeller, a turbine rotatable with said driven shaft and provided with driven blades having inner and outer peripheral end portions, the outer peripheral portions of said turbine blades being provided with cups, and the inner peripheral portions of said turbine blades being inclined in a direction opposite to the direction of rotation of the turbine, and a rotary reactor having transversely inclined parallel vanes extending between said impeller and turbine, said impeller, turbine and rotary reactor having means forming a hollow torus of ovoidal cross-section, and said rotary reactor and impeller coacting to provide a centrifugal force for driving the turbine and for shifting or redirecting fluid from the turbine to the impeller to be recirculated.

10. A fluid coupling, as defined in claim 9, wherein the spaces between the inner peripheral portions of the impeller blades are of substantially greater cross-sectional area than the cross-sectional areas of the spaces between the outer peripheral portions of the impeller blades, whereby to increase the fluid inlet capacity at the inner portion of the coupling and to produce centrifugally a greatly increased velocity of the fluid projected at the impeller outlet and into the turbine inlet.

References Cited

UNITED STATES PATENTS

| 2,630,682 | 3/1953 | Wemp | 60—54 |
| 2,663,148 | 12/1953 | Jandasek | 60—54 |
| 3,023,582 | 3/1962 | Ryan | 60—54 |
| 3,147,595 | 9/1964 | Liang | 60—54 |

EDGAR W. GEOGHEGAN, *Primary Examiner.*